3,115,174
CHEMICAL PEELING OF FRUITS AND
VEGETABLES
Malcolm W. Loveland, Orinda, Calif., assignor to
Atlas Pacific Engineering Company, a corporation
of California
No Drawing. Filed Oct. 11, 1961, Ser. No. 144,313
3 Claims. (Cl. 146—232)

This invention relates to a process for peeling fruits and vegetables.

It has been proposed heretofore to apply various corrosive alkaline materials such as sodium hydroxide and potassium hydroxide to the skin of the fruit or the vegetable to loosen the skin so that thereafter it can be readily removed by a simple spray operation or by brushing. To hasten the action of the chemical, it is also usual to effect application of the corrosive material at a relatively elevated temperature, usually one substantially above the boiling point of water. As used heretofore, the fruits or vegetables have been maintained in contact with the hot corrosive chemical at an elevated temperature for such a period of time as is necessary to effect a chemical disintegration of the skin. Usually this temperature has been so high that, during the period of contact of the corrosive solution, the flesh of the fruit or vegetable is cooked and softened to a depth of about a sixteenth to an eighth of an inch. This partial cooking is highly undesirable because when the skin is subsequently removed by application of some abrasive force such as that applied by a brush or a stream of water, the partially cooked layer will be removed along with the skin. As a result, the peeling loss is increased. Also, to the extent that the partially cooked flesh of the fruit or vegetable remains, the quality of the fruit is reduced.

Application of the chemical peeling solution at or below the cooking temperature has been proposed. The contact time required, however, of the minimum order of ten minutes and longer, renders such an operation commerically impractical because the volume of product undergoing treatment requires apparatus of impractical size.

I have found that one can effectively so break down and soften the skin of the fruit or vegetable by application for a relatively short time of a relatively strong solution of a corrosive chemical at a temperature which is elevated above the cooking temperature of the fruit flesh. Immediately thereafter and as the next step in the process of removing the skin, the fruit is again wet with a second corrosive solution. This solution, however, is preferably at a second temperature which is below the cooking temperature and substantially below that at which application was made of the first corrosive solution so that the second solution takes up heat from the fruit.

I have found that by applying the first solution at a temperature elevated above the cooking temperature of fruit and by applying the second solution at a temperature substantially reduced below that of the first solution and below the cooking temperature, deep heat penetration is prevented. The difference between the temperature of the two solutions should be such that the second solution takes up heat from the surface of the fruits or vegetables undergoing treatment and heat penetration into the flesh of the fruit is obviated. When deep heat penetration has occurred, one will find on pears, for example, a cell layer immediately beneath the skin which is relatively transparent and which is generally of the thickness of about a sixteenth of an inch. If this layer is not removed, it reduces the quality of the fruit, for it carries over and may be evident after the pears have been canned. Deep heat penetration also activates the enzymes near the surface, and quite frequently this activity may result in an increase in the carotene content and the fruit will have a surface of a yellow color.

The length of time of application of the chemical, the concentration of the chemical and the temperature of the chemical must be coordinated. That is, as the strength of the solution is increased, the temperature and time of contact can each be reduced. Also, as the temperature is increased at a given concentration of the chemical, the time of contact can be reduced. By experimentation, one can readily determine the optimum conditions for a given fruit or vegetable, as well as that temperature at which cooking occurs for a particular fruit or vegetable. The individual factors are not separately critical for, as I have indicated, if two of the factors are maintained constant, the third can be varied to obtain optimum results. Thus, one can, by maintaining a solution of a constant strength and at a given temperature, secure adequate variation by altering the period of time during which the fruit or vegetable is subject to application of a solution. This is easily achieved, for example, by varying the speed of a conveyor moving the fruit or vegetable through a treatment zone while maintaining the other factors constant. Instead of varying the period of treatment, one can vary the temperature or the concentration while maintaining the other factors constant. What one must achieve is a rapid destruction of the skin without any substantial heat penetration below the skin of the fruit or the vegetable.

In general, the temperature of the second solution should be substantially lower than the cooking temperature of the fruit or vegetable and the temperature of the first solution. I usually employ temperatures such that the difference is of the order of 50° F. or more. Also, generally the higher the temperature of the first solution, the greater should be the temperature differential between that temperature and the temperature of the second solution to insure that heat penetration is held to a minimum and the heat is withdrawn. The application of the heat and its immediate withdrawal localizes the heat in the skin layer of the fruit so that the effective action of the chemical is confined largely to the epiderm or skin layer. Immediately beneath the skin of a pear is a layer of cells which are of a yellow-green color and which are usually termed the hypoderma. This layer must also be removed along with the skin to provide fruit which is adequately peeled.

By utilizing a relatively strong solution of the corrosive chemical in the first application at a temperature above the cooking temperature of the fruit or vegetable, quick-wetting of the skin is effected and the skin remains wet with the chemical when application of the chemical is discontinued. This is important, because if the chemical drains from the surface of the fruit or vegetable, then areas of the skin will be left relatively untouched and the action of the corrosive chemical on the skin will not be uniform.

Preferably, the composition of the two solutions employed should be compatible so that no chemical reaction occurs as between the chemical adhering from the first solution upon contact with the second solution. The solutions may differ in strength but basically they should be of the same essential composition so to be compatible. Thus, one should use solutions of the same chemical such as solutions of sodium hydroxide or potassium hydroxide.

As apparatus, one can employ any suitable equipment and one can refer to the various patents which have issued to S. J. Dunkley which are generally suitable such as 1,396,268. In general, one should avoid bruising of the fruit. For example, with pears having the stem still attached, one should avoid tumbling of the fruit; otherwise, the stem will pierce the flesh of another pear and so damage the fruit.

The apparatus used to transfer the fruit from one treatment zone to the next should act relatively rapidly and effectively, otherwise the heat content of the epiderm and hypoderm layers of the fruit will penetrate the fruit flesh in the time between the first treatment zone and the application of the second colder solution in the second treatment zone. If the first solution adheres to the fruit, one can even omit application of the second solution providing the fruit is so handled that heat penetration into the fruit flesh is prevented. This can be achieved by passing the wet fruit through a zone wherein the fruit surface is cooled so that the heat on the surface of the fruit does not penetrate the fruit. In practical effect this is equivalent to application of the second solution at a temperature below the fruit cooking temperature. With some products it is desirable to shorten the time of wetting with the first solution and introduce a holding period between application of the solutions to allow the heat in the skin to flow further towards the flesh and yet not elevate the flesh above the cooking temperature. This seems to effect some economics in use of caustic and prolongs the time that the skin is above the cooking temperature without further addition of heat.

As an outline of the conditions useful in the practice of the invention, I have successfully used solutions of sodium or potassium hydroxide at concentrations between about 5% and about 50% by weight to provide the first solution. On pears, for example, I have employed solutions of these strengths at temperatures above about 160° F., the temperature at which the flesh of pears is undesirably altered. I have used temperatures as high as 250° F. successfully. One is not limited to any specific upper temperature but to insure rapid chemical action the temperature should be substantially elevated above the cooking temperature of the fruit or vegetable. The time of contact will vary with the strength of the solution and the temperature; for example, a 40% sodium hydroxide solution requires about 12 minutes at 160° F. and only about two minutes at 220° F. to effect a complete peeling. However, the treatment for 12 minutes at 160° and the treatment for 2 minutes at 220° both produced a cooked and softened zone in the fruit to a depth of ⅛ inch and more. This cooked and softened flesh is easily damaged or brushed off to give a very substantial reduction in yield or, if not removed, a serious lowering of quality.

I prefer to use such solution strengths and such temperatures as require initially a relatively short contact period for the first solution contact, preferably one measured in seconds, from about 5 to about 50 seconds, for these prevent deep heat penetration, adequately cooking and softening only the epiderm and the hypoderm to prepare them for easy attack by the second solution, all with good apparatus capacity.

For the second solution, I have employed those of a strength between 5 and 50%. The temperature of the second solution is below the cooking temperature of the fruit and is such that it abstracts heat from the fruit when applied to the fruit. Because the second solution is always at a temperature which is below the cooking temperature of the fruit and usually about 50° F. or more below the temperature of the first solution, the contact time can be increased substantially, being usually measured in minutes, whereas the time of contact of the first solution is usually measured in seconds. If desired, the economy of the caustic utilization can be increased by employing solutions containing a chloride such as sodium chloride; see Patent 2,399,282. Also, because the second solution is applied at a lower temperature, it is generally desirable to employ a solution containing more of the corrosive chemical.

As illustrative of the specific practice of the invention, pears were treated with a 30% sodium hydroxide solution at 223° F. for 25 seconds, and then for 2½ minutes with a 40% sodium hydroxide solution at 152° F., the second solution containing 1% of Tergitol as a wetting agent; this is a sodium alkyl sulfate made by Carbide and Carbon Chemical Company.

After application of the corrosive chemicals, the fruit was lightly washed with water to remove the adhering skin and chemical, then brushed and again lightly washed. Even though ripe pears were used (2½ pound pressure test), the loss in weight was substantially less than that encountered with fruit peeled on a well-adjusted pear peeling machine such as is shown in application Serial No. 766,579, filed October 10, 1958, now Patent 3,055,408. Firmer pears (8–10 pounds pressure test) peeled equally well under the same treatment. The range of from about 2½ to 10 pounds represents the range normally encountered in ripened pears. With adjustment of one or more of the three variables, much greener fruit can be peeled.

While I have dealt specifically with pears in the above, the invention can be applied effectively and to advantage to other fruits and to vegetables.

To prevent the fruit from turning brown, it can be washed with a solution of sodium chloride; a sodium sulfite solution can also be used or the alkali can be neutralized as by a citric acid solution or with hydrochloric acid.

While in the foregoing, we have mentioned the use of sodium hydroxide, one can use potassium hydroxide as well, and generally within the limits indicated. Here again the essential is the use of the relatively cold second solution application to keep the heat from penetrating into the fruit. A first potassium hydroxide solution containing 40% potassium hydroxide was applied for ten seconds at 240° F. The fruit was then removed and treated with a second solution containing 55% potassium hydroxide. The fruit was held in contact with the second solution for 3 minutes at 150° F., after which it was washed, brushed and washed again. Again the loss was substantially less than that encountered in good machine peeling.

I claim:

1. A process for removing the outer skin on fruit and the like comprising wetting the fruit for a first period of at least 5 second with a first caustic solution containing between about 5% and about 50% by weight of caustic and maintained at a temperature elevated above 160° F., then removing the wet fruit from contact with said first caustic solution, and immediately wetting the fruit for a second period substantially longer than said first period with a second hot caustic solution containing between 5% and 50% by weight of caustic and maintained at a temperature below about 160° F., removing the fruit from contact with the second caustic solution, and removing the skin from the fruit.

2. A process for removing the outer skin on fruit and the like comprising wetting the fruit for a few seconds with a first caustic solution containing between about 5% and about 50% by weight of caustic and maintained at a temperature elevated above 160° F., removing the wet fruit from contact with said first caustic solution, and immediately wetting the fruit for a few minutes with a second hot caustic solution containing between about 5% and about 50% by weight of caustic and maintained at a temperature below the cooking temperature of the fruit and at least 50° F. below the first temperature, removing the fruit from contact with the second caustic solution, and then removing the skin from the fruit.

3. A process for removing the outer skin on fruit and the like comprising wetting the fruit for a first time period of a few seconds with a first caustic solution containing at least about 5% by weight of caustic and maintained at a first temperature in excess of 160° F., then removing the wet fruit from contact with said first caustic solution and immediately wetting the fruits for a second time period of the order of at least five times the first period in a second hot caustic solution containing at least about 5% by weight of caustic and maintained at a temperature below about 160° F., and at least 50° F. below the first temperature, removing the fruit from contact with the second caustic solution, and then removing the skin from the fruit.

References Cited in the file of this patent

UNITED STATES PATENTS

| | | |
|---|---|---|
| 1,655,690 | Dunkley | Jan. 10, 1928 |
| 1,721,929 | Steinwand | July 23, 1929 |
| 1,895,102 | Mayhew | Jan. 24, 1933 |
| 3,017,298 | Wilson et al. | Jan. 16, 1962 |